United States Patent [19]

Sanders, Jr. et al.

[11] Patent Number: 4,615,738

[45] Date of Patent: Oct. 7, 1986

[54] TRANSPARENT ANTIFOG COMPOSITIONS

[75] Inventors: Albert J. Sanders, Jr., Toledo, Ohio; Michael J. Larson, Ypsilanti, Mich.

[73] Assignee: Stauffer Wacker Silicones Corporation, Adrian, Mich.

[21] Appl. No.: 785,171

[22] Filed: Oct. 7, 1985

[51] Int. Cl.⁴ .............................................. C09K 3/18
[52] U.S. Cl. .......................................... 106/13; 106/2; 106/287.14; 106/287.16
[58] Field of Search ............ 106/2, 13, 287.16, 287.14

[56] References Cited

U.S. PATENT DOCUMENTS

| | | | |
|---|---|---|---|
| 3,244,541 | 4/1966 | Fain et al. | 106/13 |
| 3,337,351 | 8/1967 | Morehouse | 106/13 |
| 3,579,540 | 5/1971 | Ohlhausen | 260/33.4 |

Primary Examiner—Lorenzo B. Hayes

[57] ABSTRACT

Transparent silicone compositions for treating nonporous substrates to impart antifog properties thereto comprising an aqueous solution containing hexamethylcyclotrisiloxane, an aliphatic alcohol and a surfactant.

5 Claims, No Drawings

TRANSPARENT ANTIFOG COMPOSITIONS

The present invention relates to an organopolysiloxane composition and more particularly to transparent organopolysiloxane compositions which may be applied to nonporous substrates to impart antifog properties thereto.

BACKGROUND OF THE INVENTION

When nonporous substrates are relatively cool and are then exposed to a warmer moist atmosphere, the cooled surface has a tendency to become fogged. The accumulation of fog on the surface may be objectionable for several reasons. If the surface of the material is intended to be transparent, such as an automobile windshield or glass lenses or mirrors, such as those in bathrooms, the fogging can become a problem and often hazardous.

Several compositions have been suggested for applying to nonporous surfaces to prevent fog formation. Compositions which have been described as antifogging agents are those disclosed in U. S. Pat. No. 3,337,351 to Morehouse, which consists of aqueous or water-soluble organic liquid solutions of organosiloxane-oxyalkylene block copolymers.

Other water-repellent compositions which have been described for treating nonporous substrates are those disclosed in U. S. Pat. No. 3,244,541 to Fain et al and U. S. Pat. No. 3,579,540 to Ohlhausen. Fain, for example, discloses a waterrepellent composition containing a solution of an organic or inorganic acid and an alkylalkoxysilane, while Ohlhausen discloses a water-repellent composition containing an alkylpolysiloxane, a mineral acid and an alcohol solvent.

One of the objections to using these water-repellent compositions as antifog compositions is that they are not transparent when diluted with water. Another objection to these water repellent compositions is that they separate into two phases when diluted with water. In addition, these water repellent compositions impart hydrophobic properties to the nonporous substrate; whereas the antifog compositions impart hydrophilic properties to the nonporous substrate.

Therefore, it is an object of the present invention to provide an organopolysiloxane composition for applying to nonporous substrates. Another object of the present invention is to provide a transparent organopolysiloxane composition which may be applied to nonporous substrates to prevent fogging. A further object of this invention is to provide a transparent antifog composition which may be applied to nonporous substrates without causing streaking.

SUMMARY OF THE INVENTION

The foregoing objects and others which will become apparent from the following description are accomplished in accordance with this invention, generally speaking, by providing transparent antifog compositions for nonporous substrates comprising an aqueous solution of hexamethylcyclotrisiloxane, an aliphatic alcohol having up to 4 carbon atoms and a surfactant.

DESCRIPTION OF THE INVENTION

The compositions of this invention are preferably prepared in a concentrated form by mixing the hexamethylcyclotrisiloxane with an aliphatic alcohol and surfactant. The resultant composition is then diluted with water to form the antifog composition.

The concentrate preferably contains from about 0.2 to about 6 percent by weight of hexamethylcyclotrisiloxane, from about 4 to about 35 percent by weight of aliphatic alcohol and from about 95.8 to about 59 percent by weight of surfactant, based on the weight of the hexamethylcyclotrisiloxane, alcohol and surfactant.

In preparing the concentrate, the hexamethylcyclotrisiloxane is dissolved in the aliphatic alcohol. Although the amount of alcohol employed is not critical, it is preferred that a sufficient amount of alcohol be present so that the weight ratio of alcohol to hexamethylcyclotrisiloxane is at least 3:1 and more preferably from about 5:1 to about 10:1. When the weight ratio of alcohol to hexamethylcyclotrisiloxane is below about 3:1, cyrstalization of the hexamethylcyclotrisiloxane has been observed at room temperature. However, when the weight ratio of alcohol to hexamethylcyclotrisiloxane is at least 3:1 and more preferably from about 5:1 up to about 10:1, a stable homogeneous solution is obtained.

A surfactant is then mixed with the hexamethylcyclotrisiloxane, alcohol solution and then the concentrate containing hexamethylcyclotrisiloxane, alcohol and surfactant is diluted with sufficient water to form an antifog composition containing from about 0.0001 to about 1 percent by weight of hexamethylcyclotrisiloxane and more preferably from about 0.005 to about 0.8 percent by weight of hexamethylcyclotrisiloxane based on the weight of the antifog composition containing hexamethylcyclotrisiloxane, alcohol, surfactant and water.

Suitable examples of aliphatic alcohols having from 1 to 4 carbon atoms which may be employed in the antifog compositions of this invention are methanol, ethanol, isopropanol, n-propanol and n-butanol with the preferred aliphatic alcohol being isopropanol.

Although other surfactants may be employed in the antifog compositions of this invention, the preferred surfactants are linear fatty alcohol ether sulfates where the fatty alcohol portion of the surfactant contains from 10 to 18 carbon atoms. Examples of suitable surfactants are ammonium lauryl ether sulfate, ammonium myristyl ether sulfate, ammonium cetyl ether sulfate and ammonium stearyl ether sulfate.

The antifog compositions are generally prepared by mixing the hexamethylcyclotrisiloxane with the aliphatic alcohol and then adding the surfactant to the resultant mixture. The resultant mixture may be diluted immediately with water or it may be added just prior to use. The compositions may be prepared at temperatures ranging from about 25 to 50° C., without using any special equipment.

The antifog compositions of this invention may be applied in several ways, such as by wiping a clean, nonporous surface with a tissue or cloth moistened with the antifog composition and wiping the surface with a dry tissue or cloth to remove the excess composition. A film can also be applied by spraying the antifog composition on a nonporous substrate with a spray gun or atomizer, or by spraying from an aerosol. In addition, the antifog composition can be sprayed on a nonporous substrate and then air dried.

In addition to using the antifog compositions of this invention on windshields and surfaces of other transparent, nonporous substrates, such as optical lenses which come into contact with water, i.e., lenses in periscopes and binoculars, they may be applied to mirrors in bathrooms to prevent fogging. Glass tumblers may also be coated with the antifog compositions to make them easier to wash and dry.

The following examples describe several preferred embodiments of this invention. In these examples all parts are by weight unless otherwise specified.

EXAMPLE 1

An antifog composition is prepared by mixing 15 parts of hexamethylcyclotrisiloxane with 85 parts of ispropanol to form a solution. About 10 parts of the resultant solution is mixed with 90 parts of ammonium lauryl ether sulfate (available as STEOL ® CA-460 from Stepan Chemical Company) and then about 1 part of the resultant solution is mixed with 99 parts of water to form an antifog composition. The resultant transparent solution is sprayed on the surface of a glass substrate and the excess removed by wiping with a clean, dry cloth. No streaking on the glass surface is observed. The treated glass surface is then placed in a refrigerator maintained at a temperature of $-10°$ C. for several minutes. The glass substrate is removed and brought into a warm room where the glass surface is contacted with moist air. The treated glass surface remained clear while a similar untreated glass substrate fogged severely.

EXAMPLE 2

An antifog composition is prepared by adding a mixture containing 4 parts of hexamethylcyclotrisiloxane and 36 parts of isopropanol to 60 parts of an ammonium lauryl ether sulfate (available as STEOL ® CA-460 from Stepan Chemical Company), and then about 1 part of the resultant solution is mixed with 99 parts of water to form an antifog composition. The resultant composition is applied to a clean, glass substrate and the excess removed with a clean, dry cloth. No streaking is observed on the glass surface.

EXAMPLE 3

The procedure of Example 1 is repeated, except that 85 parts of ethanol is substituted for the isopropanol. The resultant solution is transparent and when applied to a glass substrate and wiped with a clean, dry cloth no streaking is observed.

EXAMPLE 4

Several antifog compositions are prepared in which hexamethylcyclotrisiloxane is mixed with isopropanol and a surfactant identified as STEOL ® CA-460. The resultant compositions are each mixed with water. Each of the compositions are allowed to stand for one month at 50° C. in a closed container. All of the compositions are transparent and prevent fogging when applied to a glass substrate. The compositions are illustrated in Table I.

TABLE I

| Ingredients | (a) | (b) | (c) | (d) | (e) | (f) | (g) | (h) |
|---|---|---|---|---|---|---|---|---|
| STEOL ® CA-460 (parts) | 0.953 | 0.910 | 0.952 | 0.909 | 0.953 | 0.910 | 0.909 | 0.909 |
| Hexamethylcyclotrisiloxane (parts) | 0.002 | 0.004 | 0.005 | 0.009 | 0.007 | 0.013 | 0.018 | 0.023 |
| Isopropanol (parts) | 0.045 | 0.086 | 0.043 | 0.082 | 0.04 | 0.077 | 0.073 | 0.068 |
| Water (parts) | 99.0 | 99.0 | 99.0 | 99.0 | 99.0 | 99.0 | 99.0 | 99.0 |

EXAMPLE 5

The procedure of Example 1 is repeated, except that 3 parts of hexamethylcyclotrisiloxane is first mixed with 17 parts of isopropanol and then with 80 parts of ammonium lauryl ether sulfate (available as STEOL ® CA-460 from Stepan Chemical Company). About 4 parts of the resultant mixture is then diluted with 96 parts of water. The resultant mixture is clear and exhibits good antifog properties.

EXAMPLE 6

The procedure of Example 1 is repeated, except that 6 parts of hexamethylcyclotrisiloxane is mixed with 34 parts of isopropanol and then with 60 parts of ammonium lauryl ether sulfate (available as STEOL ® CA-460). About 1 part of the resultant mixture is then diluted with 99 parts of water. The resultant mixture is clear and exhibits good antifog properties.

EXAMPLE 7

The procedure of Example 6 is repeated, except that 34 parts of ethanol are substituted for the isopropanol. The resultant mixture exhibited good antifog properties.

COMPARISION EXAMPLES $V_1$ TO $V_3$

The procedure of Example 1 is repeated, except that other organopolysiloxanes are substituted for the hexamethylcyclotrisiloxane. The results are shown in Table II.

TABLE II

| Ingredients | $V_1$ | $V_2$ | $V_3$ |
|---|---|---|---|
| STEOL ® CA-460 | 0.91 | 0.91 | 0.91 |
| Octamethylcyclotetrasiloxane (parts) | 0.014 | — | — |
| Decamethylcyclopentasiloxane (parts) | — | 0.014 | — |
| Hexamethyldisiloxane (parts) | — | — | 0.014 |
| Isopropyl Alcohol (parts) | 0.076 | 0.076 | 0.076 |
| Water (parts) | 99.0 | 99.0 | 99.0 |
| Appearance | Hazy | Hazy | Hazy |

All of the above compositions are clear and colorless and after standing overnight they turned to a blue, hazy appearance.

COMPARSION EXAMPLE $V_4$

The procedure of Example 1 is repeated, except that 90 parts of sodium lauryl ether sulfate (available as STEOL® CS460 from Stepan Chemical Company) is substituted for the ammonium lauryl ether sulfate. The resultant composition turned hazy and exhibited poor antifog properties.

COMPARISON EXAMPLE V₅

The procedure of Example 1 is repeated, except that other surfactants are substituted for 90 parts of ammonium lauryl ether sulfate. The results are shown in Table III.

TABLE III

| Surfactants | Appearance | Antifog Properties |
|---|---|---|
| (a) Sodium lauryl sulfate | Slight haze | Poor |
| (b) Ammonium lauryl sulfate | Clear (white precipitate) | Poor |
| (c) Magnesium lauryl sulfate | Clear | Poor |
| (d) Trimethyldodecylammonium chloride (Arquad® 12-50-Armour Industrial Chemical Co.) | Clear | Poor |
| (e) Polyoxyethylene (15) soyaamine (Ethomeen® S-25 - Armour Industrial Chemical Co.) | Clear | Poor |

COMPARISON EXAMPLE V₆

The procedure of Example 1 is repeated, except that 9 parts of hexamethylcyclotrisiloxane is mixed with 51 parts of isopropanol and then with 40 parts of ammonium lauryl ether sulfate (available as STEOL® CA-460). The resultant mixture contains a yellow precipitate. About 12 parts of the resultant mixture is mixed with 88 parts of water and applied to a glass surface. The composition is cloudy and causes streaking on the glass surface.

What is claimed is:

1. A transparent organopolysiloxane composition comprising from 0.2 to 6 percent by weight of hexamethylcyclotrisiloxane, from 4 to 35 percent by weight of an aliphatic alcohol having from 1 to 4 carbon atoms, and from 95.8 to about 59 percent by weight of an ammonium fatty alcohol ether sulfate as a surfactant, based on the weight of hexamethylcyclotrisiloxane, alcohol and surfactant, in which the weight ratio of alcohol to hexamethylcyclotrisiloxane is at least 3:1.

2. The composition of claim 1, wherein the fatty alcohol portion of the surfactant has from 10 to 18 carbon atoms.

3. The composition of claim 1, wherein the surfactant is an ammonium lauryl ether sulfate.

4. The composition of claim 1, wherein sufficient water is added so that the hexamethylcyclotrisiloxane is present in an amount below 1 percent by weight based on the total weight of the composition.

5. A clear, transparent antifog composition comprising from 0.2 to about 6 percent by weight of hexamethylcyclotrisiloxane, an aliphatic alcohol having from 1 to 4 carbon atoms in an amount of from 4 to 35 percent by weight and an ammonium fatty alcohol ether sulfate as a surfactant in an amount of from 95 to 59 percent by weight based on the weight of the hexamethylcyclotrisiloxane, aliphatic alcohol and surfactant, in which the weight ratio of alcohol to hexamethylcyclotrisiloxane is at least 3:1, and water so that the hexamethylcyclotrisiloxane is present in the antifog composition in an amount of less than 1 percent by weight based on the total weight of the composition.

* * * * *